A. S. EDGETT.
Fruit-Driers.

No. 151,366.                        Patented May 26, 1874.

Witnesses.
George E. Upham
Robert Everett.

Inventor
Ananias S. Edgett,
Chipman Hosmer & Co,
Att'ys.

UNITED STATES PATENT OFFICE.

ANANIAS S. EDGETT, OF BURLINGTON, ASSIGNOR OF TWO-THIRDS HIS RIGHT TO STEPHEN D. DILLAYE AND CHARLES CARR, OF TRENTON, NEW JERSEY.

IMPROVEMENT IN FRUIT-DRIERS.

Specification forming part of Letters Patent No. 151,366, dated May 26, 1874; application filed April 11, 1874.

*To all whom it may concern:*

Be it known that I, ANANIAS S. EDGETT, of Burlington, in the county of Burlington and State of New Jersey, have invented a new and valuable Improvement in Drying Fruit, Vegetables, and other substances; and I do hereby declare that the following is a full, clear, and exact description of the construction and operation of the same, reference being had to the annexed drawings making a part of this specification, and to the letters and figures of reference marked thereon.

Figure 1:
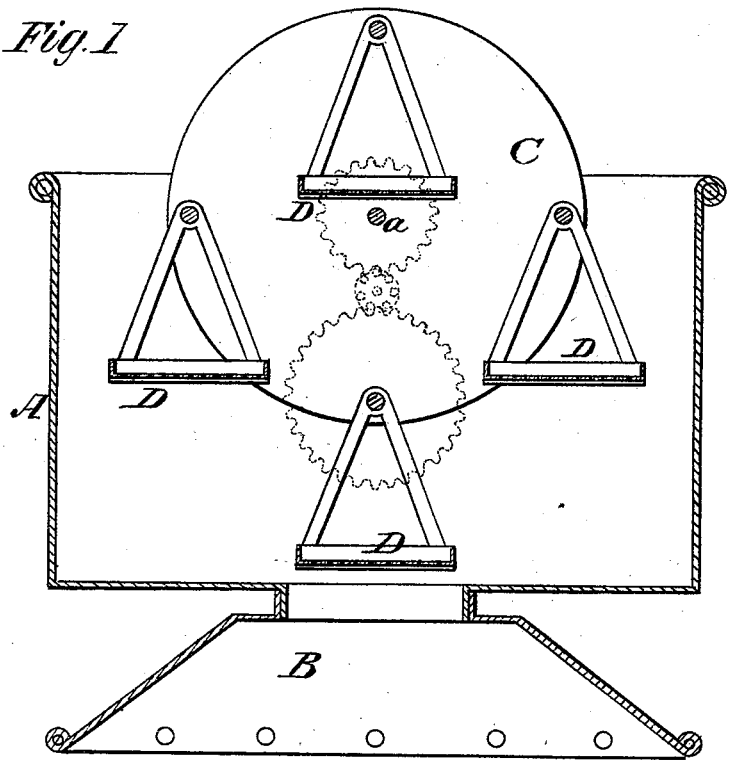
Figure 2:
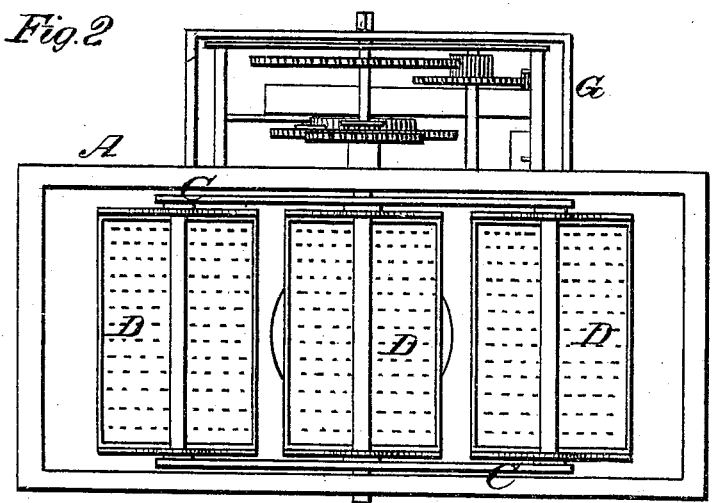

Figure 1 of the drawing is a representation of a longitudinal section of the machine, and Fig. 2 is a plan view of the same.

The following is a description of the figures represented in the annexed drawings:

A designates a case, of any suitable capacity, the lower end of which communicates with a heater by means of a hollow base, B, and a centrally-arranged tube, of any suitable length. C designates a drum, which is composed of two circular portions, suitably connected together, and secured upon a rotary shaft, *a*, which has its bearings in the sides of the case A. Outside of the case A is a box, G, containing a train of wheels actuated by a spring, for imparting rotary motion to the said drum C. Instead of using a spring as the motive power, a weight or other convenient means may be adopted for rotating the drum. Between the two plates or sides forming the drum C, and suitably suspended by arms *d*, are a number of pans, D, which are thickly perforated to allow a free circulation of air through them. These pans D are hung so that they will swing freely and always preserve a horizontal position; and in these pans the fruit or substance to be treated is put.

The wire cloth or open-work bottom slides or pans, suspended on isosceles triangular arms, hang on shafts uniting two wheels, and revolve, by connection therewith, in a movement long known as the "merry-go-round," revolving by regulated motion over a cylindrical tube opening directly in the center of the case, which boxes and supports the merry-go-round, through which heated air is to pass from stoves, furnaces, heaters, or other appliances for producing heated air, so that such air is brought into direct and continuous contact with the substance, fruit, vegetable, or other article to be affected. The circulation, it is claimed, produced by this movement of hot air, at first direct from the cylindrical tube, is regulated by the movement of the pans alternating in their positions, and passing through the cold air at the top of the box or case, and by their constant parallel position to each other, and their continually passing over and through heated air in an ascending, descending, and elliptical motion, so as to produce that constant equilibrium between the hot and the cold air essential to rapid drying, and the rapid transition from the green fruit with all its juices to the dried fruit, retaining the aroma and flavor of ripeness, and the solidity and freshness of perfect preservation, without a single element of decay. By this means heated air may be so applied as to produce dryness without burning or material shrinkage, and only the moisture contained in the fruit, vegetables, or other substance will be evolved, while the essential flavors of the juices will remain intact, and be thereby preserved. Fresh fruit or vegetables by this invention or application may be dried and fitted for market in less than two hours, and quicker than by any other known process. By using sugar as a granulated coating in the process of drying, fresh fruit can, by absorption on the one hand and assimilation on the other, be made to retain nearly all its exquisite freshness of flavor, and be dried to the exact point requisite for preservation and for perfection in quality.

The pans may be made of any material which will not corrode, and which can be perforated or worked into sieve-like openings, and may be increased in number on the pendants, which form the swings, by adding brackets at suitable distances from the base, as rests for the increased number of pans, such pans being diminished in size to meet their exact position on the swing-pendants.

This application of heated air will dry foreign fruit without taking from it any of its freshness and prevent decay, so that it may be safely packed for internal commerce.

The movement of the merry-go-round may be produced and regulated by spring, weight, horse, or any other motive power.

What I claim as new, and desire to secure by Letters Patent, is—

In a fruit-drier, the case A, and the hollow base B, connected by a centrally-arranged tube, the drum C, secured upon a rotary shaft, $a$, having its bearings in the sides of the case A, and provided with perforated swinging drying-pans, all combined as and for the purpose specified.

In testimony that I claim the above I have hereunto subscribed my name in the presence of two witnesses.

ANANIAS S. EDGETT.

Witnesses:
WM. HUTCHISON,
JOHN MATHESON.